(12) United States Patent
Krishnamurthy et al.

(10) Patent No.: US 8,880,802 B1
(45) Date of Patent: Nov. 4, 2014

(54) I/O CONTROL, SYNCHRONIZATION METHOD IN A RAID ENVIRONMENT WITH CO-EXISTING HARDWARE AND SOFTWARE-BASED I/O PATHS

(75) Inventors: Naveen Krishnamurthy, Bangalore (IN); Robert L. Sheffield, Jr., Boulder, CO (US); Rajeev Srinivasa Murthy, Bangalore (IN)

(73) Assignee: LSI Corporation, San Jose, CA (US)

( * ) Notice: Subject to any disclaimer, the term of this patent is extended or adjusted under 35 U.S.C. 154(b) by 299 days.

(21) Appl. No.: 13/212,364

(22) Filed: Aug. 18, 2011

(51) Int. Cl.
*G06F 12/00* (2006.01)

(52) U.S. Cl.
USPC .......................................................... 711/114

(58) Field of Classification Search
CPC .............. G06F 11/1658; G06F 3/0689; G06F 2212/262; G06F 12/00; G06F 12/1466
USPC .................. 711/103, 150, 152, 114; 710/200
See application file for complete search history.

(56) References Cited

U.S. PATENT DOCUMENTS

| | | | |
|---|---|---|---|
| 7,173,929 B1 | 2/2007 | Testardi | |
| 2010/0268743 A1* | 10/2010 | Hallyal et al. | 707/797 |
| 2010/0268904 A1* | 10/2010 | Sheffield et al. | 711/163 |
| 2011/0321052 A1* | 12/2011 | Long et al. | 718/103 |

* cited by examiner

*Primary Examiner* — Aimee Li
*Assistant Examiner* — Christopher Do
(74) *Attorney, Agent, or Firm* — Suiter Swantz pc llo

(57) ABSTRACT

The present invention is directed to a command block protocol which may implemented by RAID firmware for synchronizing I/Os in a RAID system which includes co-existing hardware and software-based I/O paths. The command block protocol of the present disclosure ensures that there aren't any I/Os outstanding in the fast path or any other hardware engine by making sure that the region lock (ex.—Sentinel Region Lock) is taken for the entire size of the volume. When the Sentinel Region Lock is granted, the RAID firmware may assume that there aren't any commands outstanding in the fast path hardware or pending for the region lock to be obtained. The RAID firmware would not be able to maintain integrity of user data in the absence of the new command block protocol disclosed herein.

20 Claims, 2 Drawing Sheets

US 8,880,802 B1

I/O CONTROL, SYNCHRONIZATION METHOD IN A RAID ENVIRONMENT WITH CO-EXISTING HARDWARE AND SOFTWARE-BASED I/O PATHS

FIELD OF THE INVENTION

The present invention relates to the field of data management via data storage systems (ex.—external, internal/Direct-Attached Storage (DAS), Redundant Array of Inexpensive Disks (RAID), software, enclosures, Network-Attached Storage (NAS) and Storage Area Network (SAN) systems and networks) and particularly to an input/output (I/O) control, synchronization method in a RAID environment with co-existing hardware and software-based I/O paths.

BACKGROUND OF THE INVENTION

Currently available (I/O) control, synchronization methods may not provide a desired level of performance in RAID environments with co-existing hardware and software-based I/O paths.

Therefore, it may be desirable to provide an (I/O) control, synchronization method which addresses the above-referenced shortcomings of currently available solutions.

SUMMARY OF THE INVENTION

Accordingly, an embodiment of the present disclosure is directed to a method for providing I/O control and synchronization in a RAID system which includes co-existing hardware and software-based I/O paths, said method including: detecting a need to take a command block; establishing a host I/O bit of a control register of fast path hardware of the system at a first setting for preventing the fast path hardware from processing subsequent host I/Os posted by a host driver through a request first-in first-out (FIFO) buffer of the controller; allowing the fast path hardware to complete servicing a last I/O fetched after the first setting of the host I/O bit was established; initiating a cache flush on all dirty lines of a controller cache of the system; when the cache flush is initiated on all dirty lines of the controller cache, requesting an EXCLUSIVE region lock with a RowLBA field and Len field set to cover an entire capacity of all Logical Drives (LDs) of the system; flushing hardware-based Adelson-Velskii Landis (AVL) trees holding region locks; setting a reserved field in a REGION_LOCK structure to a coded value distinguishing the REGION_LOCK structure as a Sentinel Region Lock indicating that all previous lock requests have been processed; receiving a grant of the Sentinel Region Lock; monitoring an in-flight I/O count and a fast path hardware I/O count; when the in-flight I/O count and the fast path hardware I/O count reach zero, dispatching a task requesting the command block; when the in-flight I/O count and the fast path hardware I/O count reach zero, completing activity requiring the command block; when the in-flight I/O count and the fast path hardware I/O count reach zero, establishing the host I/O bit of the control register of the fast path hardware at a second setting, said second setting configured for allowing processing of host I/Os posted through the request FIFO to resume; and releasing the Sentinel Region Lock.

A further embodiment of the present disclosure is directed to a non-transitory, computer-readable medium having computer-executable instructions for performing a method for providing I/O control and synchronization in a RAID system which includes co-existing hardware and software-based I/O paths, said method including: detecting a need to take a command block; establishing a host I/O bit of a control register of fast path hardware of the system at a first setting for preventing the fast path hardware from processing subsequent host I/Os posted by a host driver through a request first-in first-out (FIFO) buffer of the controller; allowing the fast path hardware to complete servicing a last I/O fetched after the first setting of the host I/O bit was established; initiating a cache flush on all dirty lines of a controller cache of the system; when the cache flush is initiated on all dirty lines of the controller cache, requesting an EXCLUSIVE region lock with a RowLBA field and Len field set to cover an entire capacity of all Logical Drives (LDs) of the system; flushing hardware-based Adelson-Velskii Landis (AVL) trees holding region locks; setting a reserved field in a REGION_LOCK structure to a coded value distinguishing the REGION_LOCK structure as a Sentinel Region Lock indicating that all previous lock requests have been processed; receiving a grant of the Sentinel Region Lock; monitoring an in-flight I/O count and a fast path hardware I/O count; when the in-flight I/O count and the fast path hardware I/O count reach zero, dispatching a task requesting the command block; when the in-flight I/O count and the fast path hardware I/O count reach zero, completing activity requiring the command block; when the in-flight I/O count and the fast path hardware I/O count reach zero, establishing the host I/O bit of the control register of the fast path hardware at a second setting, said second setting configured for allowing processing of host I/Os posted through the request FIFO to resume; and releasing the Sentinel Region Lock.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figure 1:
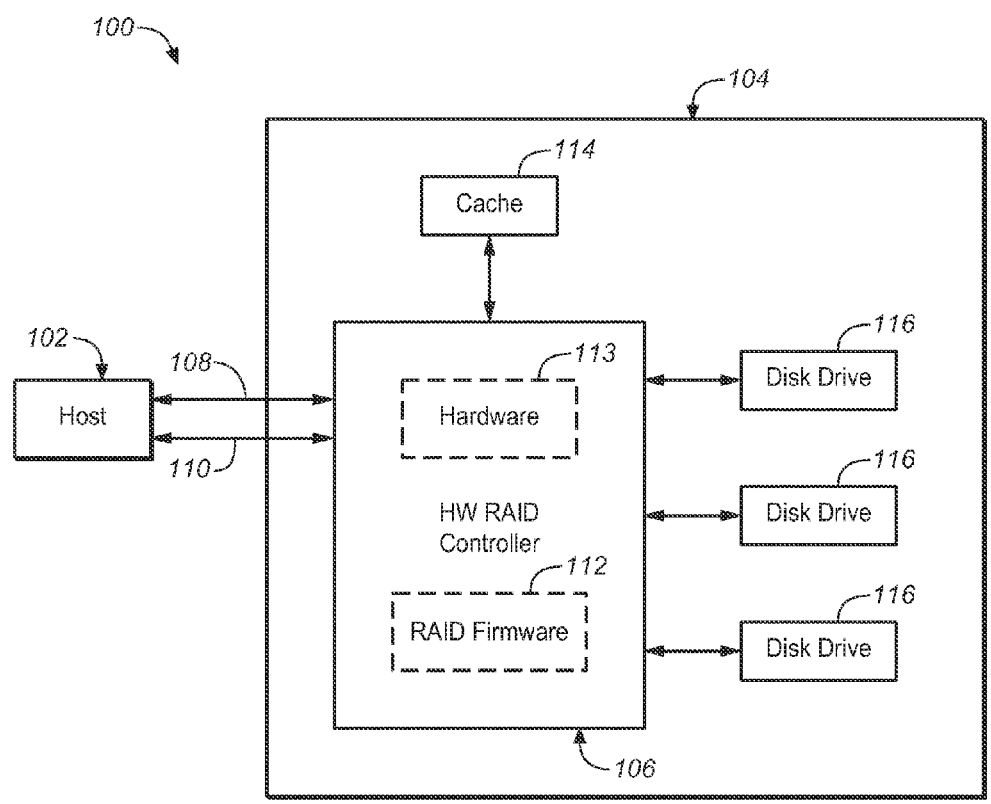
FIG. 1 is a block diagram illustration of a data storage system in accordance with an exemplary embodiment of the present disclosure.

Reference will now be made in detail to the presently preferred embodiments of the invention, examples of which are illustrated in the accompanying drawings.

There are various conditions where MegaRAID (MR) firmware needs to modify the configuration drive arrays (ex.—engaging a hot standby, starting a rebuild to change the RAID level, etc.) of a RAID system. When this happens, MR firmware must establish a clear boundary between the host inputs/outputs (I/Os) that are processed according to the configuration as it exists prior to the configuration change, and subsequent I/Os that are processed according to the configuration that is established after the configuration change. MR uses a process called command block to achieve this. Command block(s) may be effectively used when all the I/Os are controlled by MR firmware. The present disclosure provides improved command block handling for next generation MR solution(s) where there is a dedicated hardware-based I/O path running independently and not being controlled by MR firmware.

MR firmware uses command block whenever there is a need to hold (ex.—block) I/Os (ex.—host I/Os) owing to a change in configuration. A command block, when taken, ensures that there are no in-flight commands being processed by firmware (ex.—the MR firmware). It blocks the host commands. Also, when a command block is taken, internal/background operations started by firmware (ex.—the MR firmware) will be paused. A command block may also require that a controller cache of the RAID system be flushed. In such cases, command block may be granted only after the controller cache is flushed completely.

A currently-implemented command block algorithm may be as follows:

When a process requests for a command block:
1) firmware checks whether there is a command block already taken;
2) if a command block is already taken, the next request for a command block gets queued; and
3) if there aren't any active command blocks, firmware starts processing the command block request.

Processing of the command block request via the firmware may include:
4) firmware sets a flag to indicate that host commands are blocked (note that host could still be sending commands which could get queued up in the request FIFO of the controller, but firmware will not be processing any host commands when the flag is set indicating that host commands are blocked;
5) firmware will then pause all active background operations;
6) firmware will allow all active I/Os to percolate through the system until all outstanding I/Os are completed;
7) firmware will also flush the controller cache if the command block request is made with an additional requirement to flush the cache;
8) command block gets granted to the process through a callback mechanism;
9) command block gets released after completing the required action;
10) any command block requests waiting in queue will now be granted;
11) once all command blocks are processed, firmware continues processing commands from the host queue;
12) firmware will also unblock all background operations and resumes them from the point they were paused.

Thus, it is important for firmware (ex.—MR firmware) to quiesce all I/Os before granting the command block. With existing MR solutions, firmware is in total control of the I/Os, such that it may determine when in-flight I/Os complete and may take the necessary action. Though the firmware does not process any host I/Os, there may be I/Os auto-pulled by the PCI core of the controller. However, for next generation adapters for MR firmware, there may be included a dedicated hardware-assisted path (ex.—fast path) for I/Os. A host driver may make use of the dedicated hardware-assisted path to send I/Os directly from the host to the SAS core without any MR firmware involvement. So for these above-described next generation adapters for MR firmware, when there is a need for the MR firmware to take a command block, the above-described method (ex.—currently-implemented command block algorithm; current command block algorithm) does not suffice. The reason for this is that the above-described next generation adapters may implement a dedicated hardware-assisted I/O path which is not in the direct control of the firmware. If MR firmware utilized the current command block algorithm when implemented with the above-described next generation adapter, I/Os would be flowing through the dedicated hardware-assisted I/O path (ex.—the hardware-based I/O path) which may potentially cause data integrity issues. The problem with the currently-implemented command block implementation is that it does not take into account I/Os which may be executing through the hardware path (ex.—fast path).

Referring to FIG. 1, a data storage system in accordance with an exemplary embodiment of the present disclosure is shown. In exemplary embodiments, the data storage system 100 may include a host computer 102. In further embodiments, the system 100 may include a RAID subsystem (ex.—RAID system) 104 connected to the host computer 102. In exemplary embodiments, the RAID subsystem 104 may include a controller (ex.—a RAID controller) 106. For instance, the RAID controller 106 may be a hardware RAID controller.

In further embodiments, the RAID subsystem 104 and RAID controller 106 may be connected to the host computer 102 via a plurality of input/output (I/O) paths (ex.—I/O pathways). For example, the RAID controller 106 may be connected to the host computer 102 via a dedicated, hardware-assisted I/O path (ex.—a fast path) 108 included in the plurality of I/O paths. Further, the RAID controller 106 may be connected to the host computer 102 via a firmware-controlled I/O path 110 included in the plurality of I/O paths. In exemplary embodiments, the RAID controller 106 may include and/or may implement firmware (ex.—RAID firmware; MegaRAID (MR) firmware) 112. In further embodiments, the firmware 112 may be connected to the firmware-controlled I/O path 110. In further embodiments, the RAID controller 106 may include and/or may implement hardware (ex.—fast path hardware, fast path engine hardware) 113. In still further embodiments, the fast path hardware 113 may be connected to the hardware-assisted I/O path (ex.—fast path) 108.

In embodiments of the present disclosure, the RAID subsystem 104 may further include a controller cache 114. The controller cache 114 may be connected to the RAID controller 106. In further embodiments, the RAID subsystem 104 may further include a plurality of disk drives 116. The plurality of disk drives 116 may be connected to the RAID controller 106. In still further embodiments, the plurality of disk drives 116 may be presented by the RAID controller 106 to the host computer 102 as one large disk.

In exemplary embodiments of the present disclosure, the RAID controller 106 may include processing capability, such that the RAID firmware 112 may be run on the RAID controller 106. The RAID firmware 112 running on the RAID controller 106 may implement a command block protocol which accounts for I/Os which are transmitted between the host 102 and the disk drives 116 via the fast path 108 (ex.—fast path I/Os). Further, the command block protocol implemented by the RAID firmware 112 may allow for all fast path I/Os to complete their execution before any activity in the command block context is performed.

Figure 2:
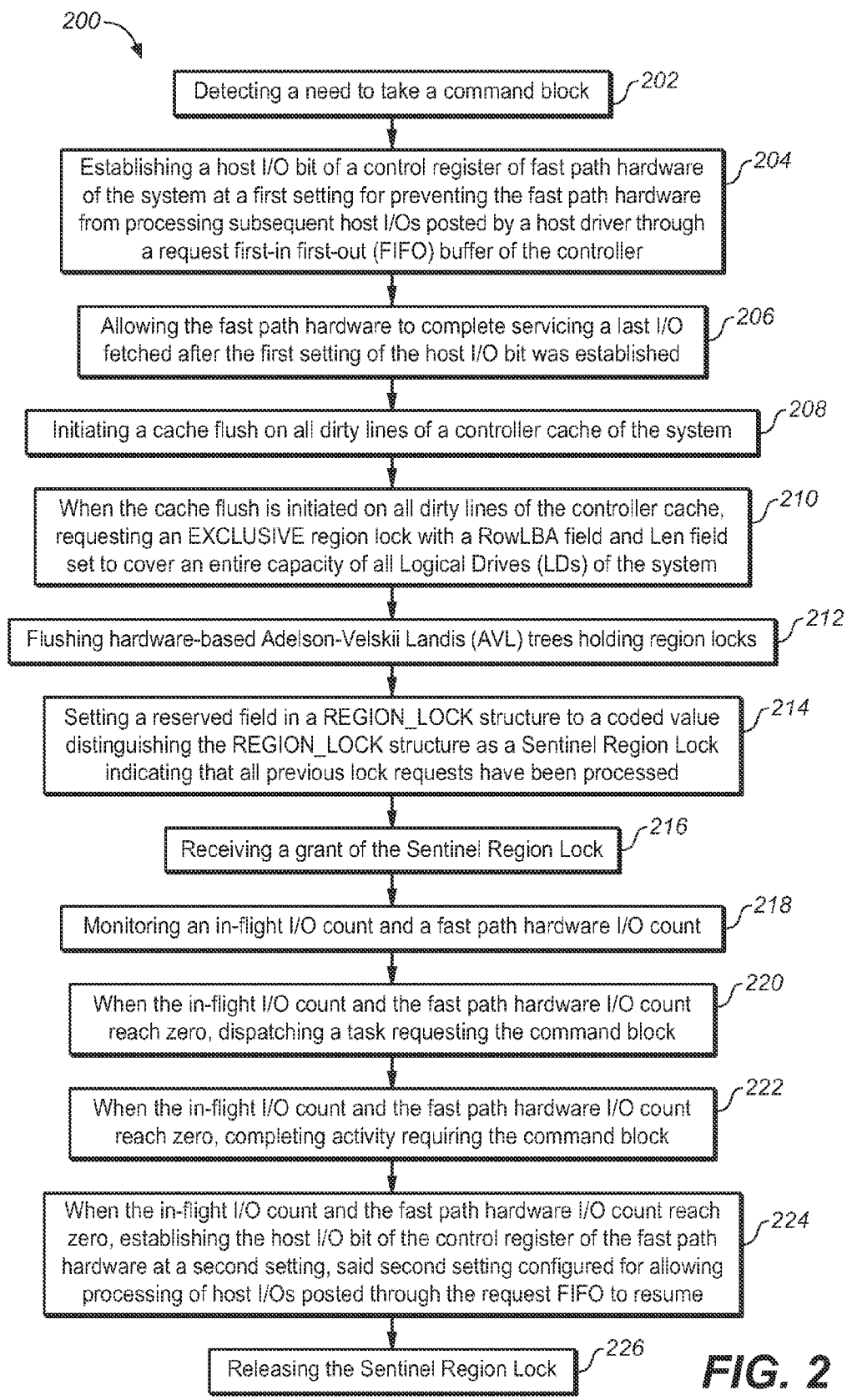
FIG. 2 is a flowchart which illustrates a method for providing I/O control and synchronization in a data storage system (ex.—a RAID system) which includes co-existing hardware and software-based I/O paths (such as the data storage system shown in FIG. 1), in accordance with exemplary embodiments of the present disclosure.

FIG. 2 is a flowchart which illustrates a method for providing I/O control and synchronization in a data storage system (ex.—a RAID system) which includes co-existing hardware and software-based I/O paths. For example, the method 200 may be performed via the RAID firmware 112 running on the RAID controller 106 of the system 100 described above. The method 200 may include the step of detecting a need to take a command block 202. For instance, the RAID firmware (ex—MegaRAID firmware) 112 may detect (ex.—recognize) a need to take a command block and may begin processing a command block request. The method 200 may further include the step of establishing a host I/O bit of a control register of the fast path hardware at a first setting for stopping (ex.—pausing, preventing) fast path hardware from processing subsequent I/Os posted by a host driver (ex.—host I/Os) through a request first-in first-out (FIFO) buffer of the controller 204. For instance, the firmware 112 may prevent both hardware 113 of the fast path 108 and the firmware 112 from processing any new I/Os posted by a driver of the host 102 through the request FIFO of the controller 106. The firmware 112 achieves this by setting a PauseHostIO bit (ex.—by pausing a host I/O bit) in a control register of the fast path hardware 113/in a control register (ex.—offset 0x00020) fast path engine 113.

In exemplary embodiments, the method 200 may further include the step of allowing the fast path hardware to complete servicing a last I/O fetched after the first setting of the host I/O bit was established (ex.—after the host I/Os were paused) 206. This ensures that the fast path hardware 113 posts any non-region lock-based commands into a hardware-based exception FIFO of the fast path hardware 113. Commands requiring region locks may be handled as described below. In further embodiments, the method 200 may further include the step of initiating a cache flush on all dirty lines of the controller cache 208. For example, when the command block request is accompanied by a cache flush request, the firmware 112 may initiate a cache flush on all dirty lines of the controller cache 114. In still further embodiments, the method 200 may further include the step of, when a cache flush is initiated on all dirty lines of the controller cache, requesting an EXCLUSIVE region lock with a RowLBA field and Len field set to cover an entire capacity of all Logical Drives (LDs) of the system 210. In further embodiments, the method 200 may further include the step of flushing hardware-based Adelson-Velskii Landis (AVL) trees holding region locks 212. In still further embodiments, the method 200 may further include setting a reserved field in a REGION_ LOCK structure to a coded value distinguishing the REGION_LOCK structure as a Sentinel Region Lock (ex.—Sentinel Region Lock Request) indicating that all previous lock requests have been processed 214. In some embodiments of the present disclosure, it may be preferable to wait for a cache flush to be initiated on all dirty lines of the controller cache 114 prior to posting the Sentinel Region Lock Request (ex.—Sentinel lock) because the cache flush may never complete if the Sentinel lock is granted first.

In further embodiments of the present disclosure, the method 200 may further include the step of receiving a grant of the Sentinel Region Lock 216. For example, while granting of the Sentinel Region Lock(s) is/are pending, the MR firmware 112 waits for the Sentinel Region Lock grant through a Maro region locking grant queue of the system 100. Further, the MR firmware 112 and the fast path hardware 113 continue processing I/Os normally until the Sentinel Region Lock(s) is/are granted. Once the Sentinel Region Lock(s) are granted to the MR firmware 112, it is an indication that there are no more region locks pending in the region lock trees.

In exemplary embodiments of the present disclosure, the method 200 may further include the step of monitoring an in-flight I/O count and a fast path hardware I/O count 218. For instance, the firmware 112 may detect (ex.—recognize) the Sentinel Region Lock grant(s) and may begin waiting for fast path hardware-initiated I/Os and firmware-initiated I/Os to complete. Further, the firmware 112 may ensure that all in-flight I/Os are complete and that all hardware sub-systems are clear of I/Os. For instance, the firmware 112 may monitor pending outstanding fast path hardware I/O counts and SAS core I/O counts until they reach zero. Still further, the firmware 112 may monitor the exception FIFO of the fast path hardware 113 until it reaches zero. In further embodiments of the present disclosure, in cases where it can be determined that there are no outstanding commands issued without requiring region locks, then there may be no need to monitor counters to determine when I/O paths are clear, it may be implicit in the granting of the sentinel region lock.

In embodiments of the present disclosure, the method 200 may further include the step of, when the in-flight I/O count and the fast path hardware I/O count reach zero, dispatching a task requesting the command block 220. The method 200 may further include the step of, when the in-flight I/O count and the fast path hardware I/O count reach zero, completing activity requiring the command block 222. The method 200 may further include the step of, when the in-flight I/O count and the fast path hardware I/O count reach zero, establishing the host I/O bit of the control register of the fast path hardware at a second setting (ex.—un-pausing the host I/O bit), said second setting configured for allowing processing of host I/Os posted through the request FIFO to resume 224. The method 200 may further include releasing the Sentinel Region Lock 226. In further embodiments, if multiple command block requests are made, successive requests may be appended to a wait list. Once the first command block request dispatch is completed, the queued request is dispatched.

The new command block protocol implemented by the RAID firmware 112 as described herein may be utilized for synchronizing I/Os in a RAID system which includes co-existing hardware and software-based I/O paths. The new command block protocol of the present disclosure ensures that there aren't any I/Os outstanding in the fast path or any other hardware engine by making sure that the region lock (ex.—Sentinel Region Lock) is taken for the entire size of the volume. When the Sentinel Region Lock is granted, the RAID firmware (MR firmware) may assume that there aren't any commands outstanding in the fast path hardware or pending for the region lock to be obtained. MR firmware would not be able to maintain integrity of user data in the absence of the new command block protocol disclosed herein.

Further, the new command block protocol of the present disclosure handles quiescing of I/Os which are being concurrently processed in both the HW path 108 and FW path 112. Still further, all I/Os, whether in the HW path 108 or the FW path 112, require region locks while being processed, and providing a common HW region lock engine (ex.—Maro), as disclosed herein, which provisions granting of region locks for both HW and FW paths (108, 112) provides a convenient mechanism for quiescing both paths (108, 112) at the same time. After pausing fetching of host I/Os, the Sentinel Region Lock may be requested, and any previously issued I/Os must complete and release their region locks before the Sentinel Region Lock may be granted. Thus, when the Sentinel Region Lock is granted, any previously issued I/Os (that require region locks) will have completed processing and will have released their region locks.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a firmware package and/or a software package. Such a firmware package and/or software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing I/O control and synchronization in a RAID system which includes co-existing hardware and software-based I/O paths, said method comprising:
    detecting a need to take a command block via firmware, the command block including at least one of blocking at least one host command and pausing at least one active background operation;
    establishing a host I/O bit of a control register of fast path hardware of the system at a first setting for preventing the fast path hardware from processing subsequent host I/Os posted by a host driver through a request first-in first-out (FIFO) buffer of the controller; and
    allowing the fast path hardware to complete servicing a last I/O fetched after the first setting of the host I/O bit was established.

2. A method as claimed in claim 1, further comprising:
    after a cache flush is initiated on all dirty lines of a controller cache of the system, requesting an EXCLUSIVE region lock with a RowLBA field and Len field set to cover an entire capacity of all Logical Drives (LDs) of the system.

3. A method as claimed in claim 2, further comprising:
    flushing hardware-based Adelson-Velskii Landis (AVL) trees holding region locks.

4. A method as claimed in claim 3, further comprising:
    setting a reserved field in a REGION_LOCK structure to a coded value distinguishing the REGION_LOCK structure as a Sentinel Region Lock indicating that all previous lock requests have been processed.

5. A method as claimed in claim 4, further comprising:
    receiving a grant of the Sentinel Region Lock.

6. A method as claimed in claim 5, further comprising:
    monitoring an in-flight I/O count and a fast path hardware I/O count.

7. A method as claimed in claim 6, further comprising:
    when the in-flight I/O count and the fast path hardware I/O count reach zero, dispatching a task requesting the command block.

8. A method as claimed in claim 7, further comprising:
    when the in-flight I/O count and the fast path hardware I/O count reach zero, completing activity requiring the command block.

9. A method as claimed in claim 8, further comprising:
    when the in-flight I/O count and the fast path hardware I/O count reach zero, establishing the host I/O bit of the control register of the fast path hardware at a second setting, said second setting configured for allowing processing of host I/Os posted through the request FIFO to resume.

10. A method as claimed in claim 9, further comprising:
    releasing the Sentinel Region Lock.

11. A non-transitory, computer-readable medium having computer-executable instructions for performing a method for providing I/O control and synchronization in a RAID system which includes co-existing hardware and software-based I/O paths, said method comprising:
    detecting a need to take a command block via firmware, the command block including at least one of blocking at least one host command and pausing at least one active background operation;
    establishing a host I/O bit of a control register of fast path hardware of the system at a first setting for preventing the fast path hardware from processing subsequent host I/Os posted by a host driver through a request first-in first-out (FIFO) buffer of the controller; and
    allowing the fast path hardware to complete servicing a last I/O fetched after the first setting of the host I/O bit was established.

12. A non-transitory, computer-readable medium having computer-executable instructions for performing a method as claimed in claim 11, said method further comprising:
    after a cache flush is initiated on all dirty lines of a controller cache of the system, requesting an EXCLUSIVE region lock with a RowLBA field and Len field set to cover an entire capacity of all Logical Drives (LDs) of the system.

13. A non-transitory, computer-readable medium having computer-executable instructions for performing a method as claimed in claim 12, said method further comprising:
    flushing hardware-based Adelson-Velskii Landis (AVL) trees holding region locks.

14. A non-transitory, computer-readable medium having computer-executable instructions for performing a method as claimed in claim 13, said method further comprising:
    setting a reserved field in a REGION_LOCK structure to a coded value distinguishing the REGION_LOCK structure as a Sentinel Region Lock indicating that all previous lock requests have been processed.

15. A non-transitory, computer-readable medium having computer-executable instructions for performing a method as claimed in claim 14, said method further comprising:
    receiving a grant of the Sentinel Region Lock.

16. A non-transitory, computer-readable medium having computer-executable instructions for performing a method as claimed in claim 15, said method further comprising:
    monitoring an in-flight I/O count and a fast path hardware I/O count.

17. A non-transitory, computer-readable medium having computer-executable instructions for performing a method as claimed in claim 16, said method further comprising:
    when the in-flight I/O count and the fast path hardware I/O count reach zero, dispatching a task requesting the command block.

18. A non-transitory, computer-readable medium having computer-executable instructions for performing a method as claimed in claim 17, said method further comprising:
    when the in-flight I/O count and the fast path hardware I/O count reach zero, completing activity requiring the command block.

19. A non-transitory, computer-readable medium having computer-executable instructions for performing a method as claimed in claim 18, said method further comprising:
    when the in-flight I/O count and the fast path hardware I/O count reach zero, establishing the host I/O bit of the control register of the fast path hardware at a second setting, said second setting configured for allowing processing of host I/Os posted through the request FIFO to resume.

20. A non-transitory, computer-readable medium having computer-executable instructions for performing a method as claimed in claim 19, said method further comprising:
    releasing the Sentinel Region Lock.

* * * * *